April 21, 1931.  F. A. PARSONS ET AL  1,801,686

MACHINE TOOL ORGANIZATION

Filed Nov. 17, 1924

Fred A. Parsons
Joseph B. Armitage
Edward J. Kearney
INVENTORS.

BY Erwin, Wheeler & Woolard
ATTORNEYS.

Patented Apr. 21, 1931

1,801,686

UNITED STATES PATENT OFFICE

FRED A. PARSONS AND JOSEPH B. ARMITAGE, OF MILWAUKEE, AND EDWARD J. KEARNEY, OF WAUWATOSA, WISCONSIN, ASSIGNORS TO KEARNEY-TRECKER CORPORATION, OF WEST ALLIS, WISCONSIN

MACHINE-TOOL ORGANIZATION

Application filed November 17, 1924. Serial No. 750,238.

This invention relates to improvements in a machine tool organization, and more particularly to the organization with a machine tool of its controlling levers.

In certain highly organized types of machine tools, such, for instance, as the type commonly known as the knee type milling machine, it is of great importance that the controlling devices should be of ready accessibility to the operator. Such machines ordinarily embody a spindle driving train situated in the column of the machine at a point relatively distant from the operator's position and a driving pulley for the spindle train which is even more distant from the position of the operator.

In the past it has frequently been necessary that the operator should leave his operating position in order to start or stop the spindle driving train. Other constructions involved extended levers projecting to points where they were graspable by the operator from his normal operating position, but nevertheless with considerable inconvenience and even possible danger, inasmuch as ordinarily such an operation of the handle involved the proximity of the operator to the cutting tools of the machine. Furthermore, in many cases these handles have projected forward into areas or zones which should properly be reserved as being at times required for the movement of the work or the operation of the machine, thus adding to the general inconvenience.

It is the purpose of this invention to provide manual control for the spindle driving train of a milling machine by methods giving maximum convenience of operation, and whereby such convenience of operation may be accomplished without passing any portion of the controlling mechanism thru or near areas or zones properly reserved for work or tool movements.

A further purpose is to provide suitable mechanism in a milling machine of the knee type whereby an operating lever for the main control may be located at a point most convenient for the operation of the machine and for the operator and from which the mechanism may transmit motion to remote portions of the machine organization for the control of a spindle driving train.

A further purpose is to locate a manual control member on the knee of a knee type milling machine and provide suitable mechanism whereby such a lever may control the driving train of the machine.

A further purpose is to provide a multiplicity of control levers some of which are controllable from the operator's normal or main operating position, and others of which are controllable from other secondary or minor operating positions whereby in case of accident, whatever may be the position of the operator, it is not necessary for him to pass around the machine in order to immediately bring the machine to a stop.

Other purposes relate to control means for the driving train of a milling machine of the knee type, including a starting clutch and brake for stopping, and will be apparent from the specification, claims, and accompanying drawings herewith.

In the drawings.

Like reference characters in the various views denote the same parts.

Figure 1:
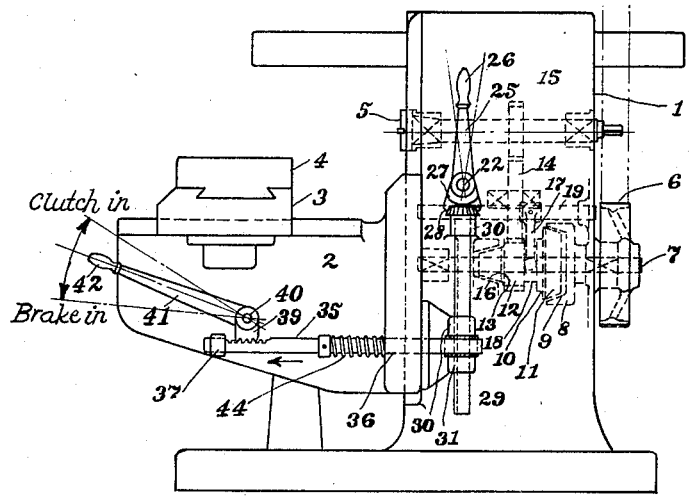
Figure 1 is a side view of a milling machine of the type ordinarily known as the knee and column type.
Figures 2, 4:
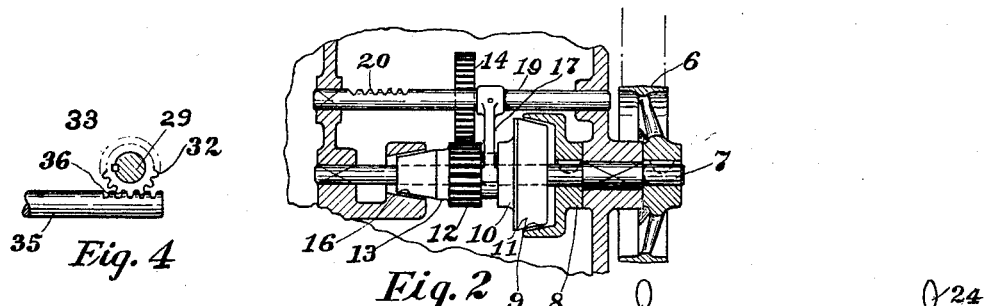
Figure 2 is a vertical section thru a portion of the mechanism shown in Figure 1, being specifically the drive pulley, main clutch and braking mechanism.
Figure 4 is a detail view taken on the section indicated at 4—4 in Figure 3.
Figure 3:
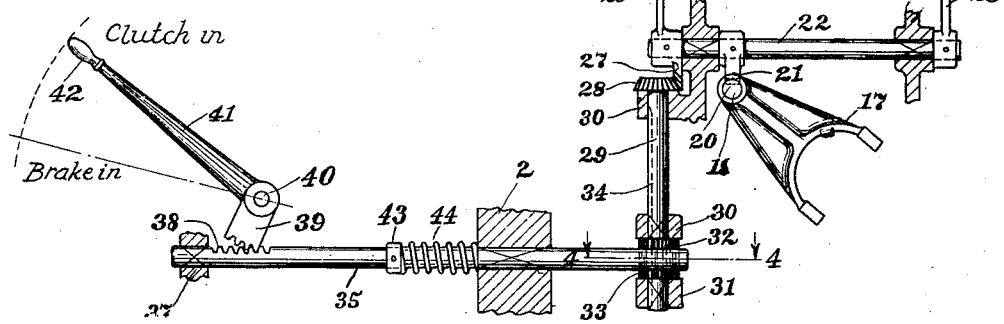
Figure 3 is a diagrammatic development of the various control elements in which certain portions of the control mechanism have, for the sake of clearer description, been brought into the same plane as other portions of the mechanism as will be later more fully described.

1 is a column or housing upon which is slidably guided and supported a knee 2 which provides vertical adjustment for a saddle 3 and a table 4. Saddle 3 is slidably guided and supported upon the knee 2, thus providing cross or transverse adjustment of the table 4, while table 4 is slidably guided and supported upon saddle 3, thus providing longitudinal adjustment for the work, the several relatively slidable members together forming a relative adjustment between work supported upon table 4 and the column in three transverse directions.

The column 1 likewise supports a rotatable spindle 5 journaled in suitable bearings fixed in the column, and a driving pulley 6 fixed with a shaft 7 which is rotatably mounted in suitable bearings in the column 1 and adapted to be belt driven by means of a belt engaging the pulley 6 from a source exterior to the machine tool, as for instance, a line shaft pulley. The shaft 7 may likewise be driven by any other suitable means, as for instance, an electric motor, and with various other forms of driving connections.

Fixed with the shaft 7 is a clutch member 8 having an internal annular tapered portion 9. The shaft 7 supports an independently rotatable member 10 which combines several elementary portions fixed to rotate together, including an annular cone portion 11, which is adapted to engage frictionally the internal cone portion 9 when the member 10 is moved rearwardly or toward the pulley 6 along the shaft 7, also a gear 12 and an annular cone portion 13. The gear 12 meshes with a gear 14 in any of the positions of adjustment of the member 10, and is rotatably supported in the column 1 in a position of permanent engagement with a gear 15 fixed with the spindle 5. The cone portion 13 is adapted to frictionally engage an internal annular cone portion 16 which is fixed with the column, such engagement being effected whenever the member 10 is moved oppositely from the rearward movement previously described.

It will thus be seen that the motion transmitted to the shaft 7 as previously described from an outside source by the pulley 6 may be communicated to the member 10 by moving the member 10 rearwardly until cone clutch portions 11 and 9 are frictionally engaged, and that in such a case motion will be transmitted to the spindle 5 thru the gears 12, 14, and 15. The motion thus set up may be discontinued and a brake applied for stopping the spindle by a reverse movement of the member 10, in which case cones 9 and 11 disengage and cone 13 frictionally engages the fixed and stationary cone member 16, which will thereupon act as a brake for the stopping of the spindle.

To bring about the above described movements of the member 10, a fork 17 engages an annular groove 18 in the member 10 and is movable by means which will now be described.

Fork 17 is fixed upon a rod 19 slidable in suitable bearings in the column 1 and having rack teeth 20. Rack teeth 20 are engaged by a gear segment 21 fixed upon a shaft 22 adapted to be oscillated in suitable bearings in the column 1. The shaft 22 projects from the column at both ends and upon one end carries a lever 23 provided with a hand grip 24; and upon the other end a similar lever 25, also provided with a hand grip 26, and further provided with a gear segment 27. Both the lever 23 and the lever 25 are fixed with the shaft 22 by means such as the pins shown. The gear segment 27 meshes with a bevel gear 28 fixed with a shaft 29 rotatable in a bearing 30 in the column and projecting downwardly therefrom. The lower end of shaft 29 passes thru bearings 30 and 31 in which the shaft may rotate and which are fixed for movement with the knee 2.

Between bearing 31 and bearing 30 is retained a pinion 32 slidably engaging shaft 29 but in keyed relationship therewith by means of a key 33 fixed in gear 32 and slidable in a keyway 34 in the shaft 29.

A rod 35 has rack teeth 36 engaging the pinion 32 whereby an endwise movement of the rod may cause the pinion to rotate. Rod 35 is slidably supported in bearings 36 and 37 which are fixed with knee 2, and has rack teeth 38 engaged by a gear segment 39 pivoted upon a stud 40, which is fixed on knee 2. Fixed with the gear segment 39 is a lever 41 having a hand grip 42 by means of which the segment 39 may be oscillated.

Having now described in detail the mechanism by which the member 10 may be actuated, I will now describe the action of said mechanism.

The hand grip 42 projects in a position to be most readily grasped by the operator when in his normal operating position, which is, for this type of machine tool and referring to Figure 1, just to the left of the knee therein shown and facing the column.

Should the operator, however, for any purpose incidental to the setting up of the machine, or from any other reason, have moved from this position and be at the back of the machine, there is available the hand grip 26 or the hand grip 24 accordingly as he may be at the one side or the other of the column 1.

Assuming, however, that he is in his normal operating position as above described, and that the mechanism controlling the clutch or the member 10 is in the position shown in Figure 1, or a neutral position, should he then desire to connect the spindle 5 with the driving pulley 6 for rotating the spindle, he may grasp the hand grip 42 and move it upwardly, whereupon the teeth of segment 38 will cause shaft 35 to be moved in the direction of the arrow shown in Figure 1, thus rotating or oscillating pinion 32, shaft 29, bevel-gear 28, segment 27, shaft 22, and segment 21. The rotation of segment 21 will in turn cause a rearward movement of the shaft or rod 19 toward the driving pulley 6, due to the engagement of the segment 21 and rack teeth 20. Fork 17 being fixed with the rod will also be caused to move rearwardly and will force member 10 rearwardly thru its engagement with the groove 18. The cones 11 and 9 will eventually engage, thus completing the driving connection between the spindle 5 and the pulley 6 thru the train of gears 12, 14, and 15 previously described.

Assuming that the foregoing has taken place, and that the operator then desires to disconnect or break the driving connection to the spindle 5, the hand grip 42 is then thrust downwardly causing a reverse movement to that previously described for the various parts in the mechanical train connecting the hand grip 42 and the fork 17, whereupon the member 10 will be oppositely moved, either to a central position as shown in Figure 1, or, if the movement of the hand grip is continued downward, until the cones 13 and 16 engage. Since these cone surfaces form a friction brake, the spindle may thus be brought very quickly to a full stop.

The weight of the handle 41 may be counterbalanced, if desired, so that it will not of itself cause a movement of the connecting train. For this purpose we preferably employ a spring 44 acting in the one direction against the bearing 36 and in the other direction against a collar 43 fixed with the rod 35. Spring 44 together with the friction incidental to the various bearings effectually prevents the weight of lever 41 and hand grip 42, or any other of the various movable parts from setting up undesired movements of the train for actuating member 10.

It will now be apparent that complete control of the member 10 and thus of the spindle actuation from pulley 6 may be had by the operator from whatever position he may happen to be situated, but especially from his normal operating position in front of the table; and furthermore, that the operating lever 42 being movable with the knee 2, will be at all times in the position of greatest convenience for the operator. It will be obvious, moreover, that the various operating instrumentalities, such as levers 41, 25, and 23, and the various parts of the mechanical trains connecting these levers with the member 10 are located outside of any zones or areas properly reserved for relative movement of the work mounted on table 4.

Having thus fully revealed our invention, we claim:

1. A milling machine organization combining a column, a tool spindle supported therefrom, a work support movable with respect to the column, a driving train potentially available for rotating said spindle and including a starting and stopping clutch, a brake including an element adjustable to and from an operative position for retarding spindle rotation, and a plurality of control levers each operatively connected both with said clutch and said element, one of said levers being mounted at each side of said column and another of said levers being mounted upon and movable with said work support.

2. In a device of the character described, the combination with a milling machine column and a driving shaft and a driven gear mounted therein, of an adjustable freely movable gear upon said shaft between spaced positions thereon and adapted in all positions to mesh with said driven gear, a clutch element fixed to said shaft and adapted for engagement with said adjustable gear in one of said positions thereof, a brake element adapted for engagement with said adjustable gear in said other position thereof, motion transmitting connections positively connected with said gear for the adjustment thereof between said positions, whereby to control selectively the clutching or the braking of said adjustable gear, a work support adjustable with reference to said column, and a hand lever mounted on said support and operatively connected with said connections for the control of said adjustable gear.

3. In a milling machine, the combination with a column and a vertically adjustable work support, of a hand lever mounted on said support, a shiftable clutch device in said column, a shaft paralleling the path of movement of said support and operatively connected with said device to transmit motion thereto for the shifting thereof upon the rotation of the shaft, a member connected with said support for movement therewith and connected with the shaft for rotative movement therewith, said member being rotatable with respect to the support and slidable with respect to the shaft, and manually operable means on said support for rotating said member.

4. In a device of the character described, the combination with a column and a spindle supported therefrom, of an axially adjustable rotor in operative connection with said spindle and provided with opposed friction faces, a primary clutch element adapted in one axial position of said rotor to contact with one of said faces, a driving shaft connected with said element, a relatively fixed brake member adapted in another axial position of said rotor to contact with the other of said faces, means for axially adjusting said rotor, a rock shaft connected with said means, a manually operable control member at each side of the column connected with said rock shaft, an adjustable work support, a hand operated control member thereon, a control shaft supported by said column in parallelism with the path of movement of said support and in operative connection with said rock shaft, and motion transmitting connections operatively engaging said last mentioned member with said control shaft and adapted to maintain such engagement in a plurality of positions of said support.

FRED A. PARSONS.
JOSEPH B. ARMITAGE.
EDWARD J. KEARNEY.